Oct. 29, 1940.    F. J. CHAMPLIN ET AL    2,219,915
CONTROL CIRCUIT
Filed April 19, 1938

Inventors:
Franklin J. Champlin,
Harry R. West,
by Harry E. Dunham
Their Attorney.

Patented Oct. 29, 1940

2,219,915

UNITED STATES PATENT OFFICE 2,219,915

CONTROL CIRCUIT

Franklin J. Champlin, Dalton, and Harry R. West, Pittsfield, Mass., assignors to General Electric Company, a corporation of New York Application April 19, 1938, Serial No. 202,890

7 Claims. (Cl. 171—119)

This invention relates to control circuits and more particularly to improvements in the auxiliary supply circuits for induction voltage regulators.

When automatically operated, induction voltage regulators require a source of relatively low voltage current for energizing the regulator auxiliaries, such as the operating motor and the voltage regulating relay. Heretofore, this source has been a separate auxiliary supply transformer which is generally a small device with windings of very fine wire which are very difficult to insulate and, as a result, such devices are more subject to failure than the windings of the regulator itself.

In accordance with the present invention advantage is taken of the large core section and the large flux which are present in the regulator for producing the auxiliary supply current directly in the regulator by transformer action between the main windings of the regulator and an auxiliary supply winding, or windings, placed in the regulator. The auxiliary supply winding may be placed either in separate slots or in the same slots with the main windings of the regulator. In either case it has its own insulation and it is placed outside the major insulation on the main coils so that upon the occurrence of over voltage in the regulator, failure of the control winding can occur only if the major insulation of the regulator coils fail. This is very unlikely but further protection against over voltage in the auxiliary winding is provided by grounding one of its terminals to the core of the regulator.

An object of the invention is to provide a new and improved control circuit for transformer regulators.

Another object of the invention is to provide a new and improved auxiliary supply circuit for automatically controlled induction voltage regulators.

The invention will be better understood from the following description taken in connection with the accompanying drawing and its scope will be pointed out in the appended claims.

Figure 1:
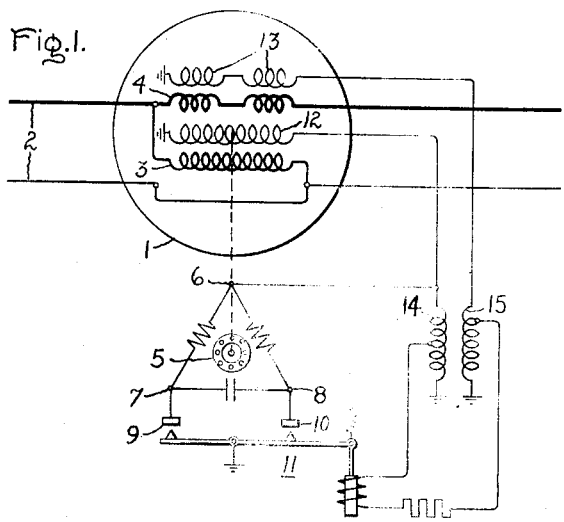
Figure 4:
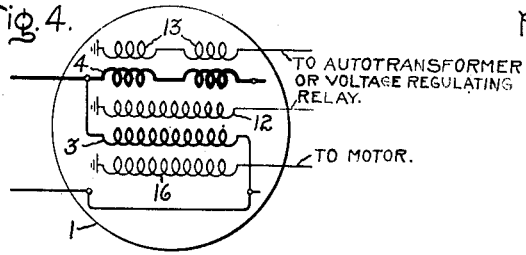
Figure 5:
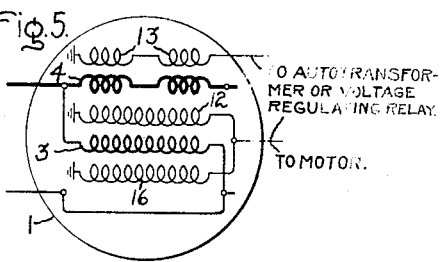
Figure 6:
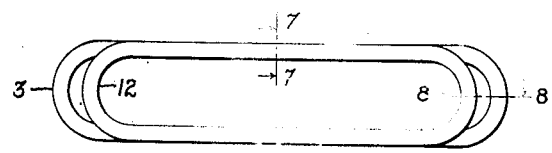
Figure 7:
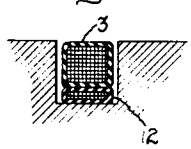
Figure 8:
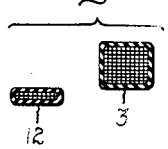

In the drawing, Fig. 1 is a circuit diagram of a preferred embodiment of the invention, Figs. 2, 3, 4 and 5 illustrate modifications of the arrangement of the auxiliary supply windings, Fig. 6 is a plan view showing the relationship between the main and auxiliary supply windings in the regulator, and Figs. 7 and 8 are sectional views of Fig. 6 taken at different places thereon.

Referring now to the drawing and more particularly to Fig. 1, there is shown therein an induction voltage regulator 1 connected in an alternating current circuit 2. The regulator consists essentially of a shunt or primary winding 3 connected across the circuit 2 and a two-section series winding 4 connected in the main circuit 2 on the load side of the shunt winding. The series winding of the induction regulator is almost always connected on the load side of the shunt winding because in that manner a given range of regulation can be obtained with a smaller size regulator. Thus, if the series winding is on the supply side of the shunt winding, the shunt winding must be insulated for a higher voltage, as it is subjected to the regulating voltage in addition to the circuit voltage, and the series winding must be able to carry a larger current, as it must carry the primary load and exciting currents in addition to the circuit current.

As the shunt and series windings constitute a transformer, a regulating voltage is inserted in the circuit 2 by the series winding and this voltage is adjusted by rotating the shunt and series windings with respect to each other, thereby varying their mutual coupling. Usually the series winding is mounted on the stationary part of the regulator and the shunt winding is mounted on the rotor.

For driving the regulator there is provided a conventional reversible motor 5 having a common terminal 6 and forward and reverse terminals 7 and 8 respectively. The forward and reverse terminals are connected respectively to the raise and lower contacts 9 and 10 of a voltage regulating relay or contact-making voltmeter 11, usually through a conventional relay switch (not shown).

The current for the motor 5 and the contact-making voltmeter 11 is obtained from a pair of auxiliary windings 12 and 13 mounted on the regulator in such a manner that winding 12 has a voltage induced in it which is proportional to the voltage of the shunt winding 3 and winding 13 has a voltage induced in it which is proportional to the voltage of the series winding 4.

In a few special cases these auxiliary windings 12 and 13 may be used to energize the contact-making voltmeter and the motor directly but in most cases, as will be explained below, it has been found that this is not practicable. It is therefore necessary to provide a pair of additional transformers 14 and 15 from which the correct voltages may be obtained. These additional transformers are preferably, but not necessarily, auto-transformers.

Most operating motors for induction regulators have a voltage rating which is higher than that of the voltage-regulating relay, these values being typically 240 volts for the motor and 120 volts for the relay. Thus, it will be observed that the common terminal of the motor 6 is connected to a point on the auto-transformer 14 which is at about twice the voltage of the point thereon to which one terminal of the voltage-regulating relay operating winding is connected. The other terminal of the operating winding of the voltage-regulating relay is connected to the auto-transformer 15 and as each of these auto-transformers have grounded terminals, the resultant voltage applied to the winding of the contact-making voltmeter will be proportional to the sum of the auto-transformer voltages. Each auto-transformer voltage is proportional to the voltage of its associated auxiliary winding and the voltages of the auxiliary windings in their turn are proportional respectively to the voltages of the shunt and series windings of the regulator. Thus, the contact-making voltmeter or voltage-regulating relay is energized with a voltage which is proportional to the voltage on the output or load side of the regulator.

The reason the auto-transformers 14 and 15 are necessary is because the turn ratio between the main windings of the regulator and the auxiliary windings for obtaining directly the rated voltage of the motor and voltage-regulating relay is such that fractional turns of the auxiliary windings would be necessary. However, fractional turns are unsatisfactory because variations in leakage flux at different loads and power factors would seriously affect the voltage ratio between the main winding and an auxiliary winding having fractional turns. Therefore, the auxiliary windings are each wound with an integral number of turns and the proper voltage is obtained therefrom by means of the auto-transformers 14 and 15. For example, in a typical 2400 volt regulator there are 54 turns in a coil on the rotor and four turns in a coil on the stator. If we consider that these windings are all located in the slots on one pole of a two-pole regulator, they require a voltage ratio of 1200:240 volts when the poles are connected in series in order to obtain the necessary 240 volts for the motor. This requires a turn ratio of 5:1. However, one-fifth of 54 turns does not give an integral number of turns for the auxiliary winding to be placed in the slots with the main winding on the rotor and similarly one-fifth of four turns does not give an integral number of turns for the auxiliary winding to be placed in the slots with the main series winding on the stator. In such a case we use eleven complete turns for the auxiliary winding on the rotor and one complete turn for the auxiliary winding on the stator. This gives a slightly higher voltage than desired and this voltage is then stepped down by the auto-transformers 14 and 15 to the proper value.

In the operation of the system as shown in Fig. 1, any deviation in voltage on the load side of the regulator from an arbitrarily selected normal value at which the voltage-regulating relay 11 will balance will cause this meter to close one or the other of its contacts 9 or 10, thus connecting the motor 5 across the auto-transformer 4 and causing it to operate the regulator 1 in the proper direction to restore the voltage to normal. Any operation of the regulator will vary the voltage of its series winding, which by transformer action will then vary the voltage in the auxiliary winding 13, which variation in voltage will be transmitted to the auto-transformer 4 and thence to the voltage-regulating relay 11, so that as soon as the sum of the portions of the voltages of the auto-transformers 14 and 15 across which the voltage-regulating relay is connected again equals the setting of the voltage-regulating relay, the motor will stop.

Figure 2:
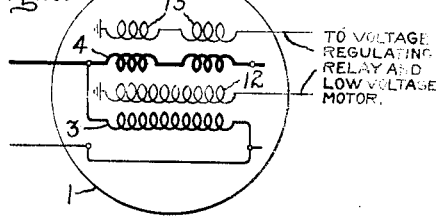

In the modification shown in Fig. 2, the auto-transformers have been omitted and a low voltage motor of the same voltage rating as the voltage-regulating relay has been employed. Such an arrangement greatly simplifies the control as the motor and the voltage-regulating relay may be connected directly across the ungrounded terminals of the auxiliary windings 12 and 13.

Figure 3:
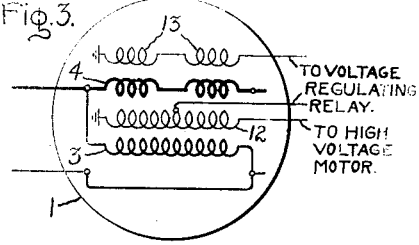

In Fig. 3 the arrangement is such as to permit the omission of the auto-transformers but the winding 12 is wound for a high enough voltage to supply a high voltage motor and a low voltage tap is provided on the winding 12 for connection to the contact-making voltmeter.

In Fig. 4 a third auxiliary winding 16 is provided for supplying the motor directly and the windings 12 and 13 merely supply the contact-making voltmeter either directly or through auto-transformers, as may be required. This arrangement has the advantage that the voltage drop produced by the motor current will not appear in the voltmeter circuit as is the case in the previously described circuits. It, however, requires that three auxiliary leads be brought out from the regulator. The windings 12 and 16 are also preferably so arranged on the rotor that winding 12 is on one pole and winding 16 is on another pole, thus, further insuring that there will be a minimum interaction between the operation of the motor and the operation of the contact-making voltmeter.

In Fig. 5 a compromise arrangement is shown in which the windings 12 and 16 are connected in parallel and a common lead brought out of the regulator. The parallel connection of the windings 12 and 16 provides more capacity for energizing the motor so that the motor current will produce a lower voltage drop and will produce much less effect on the operation of the contact-making voltmeter.

Referring now to Figs. 6, 7 and 8, the auxiliary winding 12 is placed in the same slot in the core as the shunt winding 3 and the auxiliary winding is placed underneath the main winding. This construction minimizes the danger of damage to the insulation of the auxiliary winding when the coils are placed in the slots and it also insures that in case of failure of the insulation of the main winding that the auxiliary winding will be maintained essentially at ground potential.

It will also be noted that at the ends of the coils where they are outside of the core, the auxiliary coils are spaced away from the main coils sufficiently to compensate for the over-compounding obtained in the slot action due to the auxiliary supply winding coupling more of the leakage flux than the main winding. This arrangement has proven very effective in producing a voltage in the auxiliary winding which is directly proportional to the voltage in the main winding over a wide range of currents and power factors.

With an ordinary regulator construction it is desirable and often necessary to place the auxiliary windings in all of the slots in order to compensate for any air gap eccentricity. However, with regulators having core constructions making use of a salient pole design the air gap eccentricities cause considerably less flux distortion and, as a result, we have found that it is possible to use the slots on only one pole of a two-pole regulator for the supply for a voltage-regulating relay.

While there have been shown and described particular embodiments of this invention, it will be obvious to those skilled in the art that various changes and modifications can be made therein without departing from the invention and, therefore, it is aimed in the appended claims to cover all such changes and modifications as fall within the true spirit and scope of the invention.

What we claim as new and desire to secure by Letters Patent of the United States, is:

1. In combination, a regulating transformer having an exciting winding adapted to be connected across an alternating current load supplying circuit and having a variable voltage secondary winding adapted to be connected in said circuit on the load side of said exciting winding, separate auxiliary windings arranged respectively in inductive relation with said exciting and series windings, and control means for said regulating transformer arranged to be energized by the sum of two voltages derived respectively from said auxiliary windings.

2. In a regulator system an alternating current circuit, a transformer regulator connected therein, a motor for driving said regulator, a voltage-regulating relay for controlling said motor, means including an auxiliary winding carried by said regulator in inductive relation therewith for supplying operating current for said motor, and means including a second auxiliary winding carried by said regulator in inductive relation therewith for energizing said voltage-regulating relay.

3. In combination, an induction voltage regulator having main coils placed in slots in a magnetic core structure, operating means for said regulator, and means for energizing said operating means comprising an auxiliary winding placed in slots with said main coils.

4. In combination, an induction voltage regulator having an insulated main coil placed in slots in a magnetic core structure, a control circuit for said regulator, and means for energizing said control circuit comprising an insulated auxiliary winding placed in said slots outside of the insulation of said main coil.

5. In combination, an induction voltage regulator having an insulated main coil mounted in slots in a magnetic core structure, said coil having end portions which are outside of said slots and core structure, a control circuit for said regulator, means for energizing said control circuit comprising an insulated auxiliary winding placed in said slots underneath said main coil and outside of the insulation thereof, said auxiliary winding having portions thereof which are outside of said slots and core, the outside portions of said auxiliary winding being spaced away from the outside portions of said main coil so as to compensate for the effect of leakage flux in said slots.

6. In combination, an induction voltage regulator having a shunt winding and a series winding, a low voltage auxiliary winding inductively coupled to said shunt winding and having one terminal thereof grounded, a low voltage auxiliary winding inductively coupled to said series winding and having one terminal thereof grounded, a pair of auto-transformers having common terminals thereof grounded and having their input terminals connected respectively to the ungrounded terminals of said auxiliary windings, and a voltage-regulating relay for said regulator having an operating winding connected respectively to said auto-transformers.

7. In combination, an induction voltage regulator having shunt and series main windings, a low voltage auxiliary supply winding inductively related to one of the main windings of said regulator and having an integral number of turns, the rated voltage of said control circuit bearing such relation to the rated voltage of said regulator and the turns of its main windings as to require a fractional number of turns on said auxiliary winding in order to obtain the correct control circuit voltage, and a separate transformer interposed between said auxiliary winding and said control circuit for energizing said control circuit with the proper voltage.

FRANKLIN J. CHAMPLIN.
HARRY R. WEST.